United States Patent
Goldberg et al.

(10) Patent No.: US 6,226,360 B1
(45) Date of Patent: May 1, 2001

(54) SYSTEM AND METHOD FOR DELIVERY OF PRE-RECORDED VOICE PHONE MESSAGES

(75) Inventors: Randy G. Goldberg, Princeton; Bruce Lowell Hanson, Little Silver; Richard M. Sachs, Middletown, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/081,744

(22) Filed: May 19, 1998

(51) Int. Cl.[7] .............................. H04M 1/64; H04M 11/00
(52) U.S. Cl. ..................... 379/69; 379/67.1; 379/92.03
(58) Field of Search ................................. 379/22, 23, 24, 379/25, 67.1, 69, 92.03, 88.23

(56) References Cited

U.S. PATENT DOCUMENTS

| | | | |
|---|---|---|---|
| 4,941,168 | * | 7/1990 | Kelly, Jr. ................................. 379/69 |
| 5,333,180 | * | 7/1994 | Brown et al. ....................... 379/88.06 |
| 5,371,787 | * | 12/1994 | Hamilton ............................... 379/386 |
| 5,594,791 | * | 1/1997 | Szlam et al. ........................... 379/265 |
| 5,644,624 | * | 7/1997 | Caldwell ................................. 379/69 |
| 5,724,420 | * | 3/1998 | Torgrim ................................ 379/372 |
| 5,809,113 | * | 9/1998 | Lieuwen .................................. 379/69 |

\* cited by examiner

*Primary Examiner*—Fan Tsang
*Assistant Examiner*—Ovidio Escalante

(57) ABSTRACT

A system and method for delivering automated pre-recorded messages to intended recipients is disclosed. An automated call controller places phone calls to intended recipients and plays a pre-recorded message for the recipient after the call is answered. The automated call controller accesses phone numbers for intended recipients from a database and automatically dials the accessed phone numbers. The automated call controller monitors parameters associated with the telephone call. A message delivery decision model analyzes these monitored parameters, and any other parameters input to the decision model, and, based on the analysis of the parameters, optimizes the delivery of the pre-recorded message by the call controller. Results from the completed phone call are stored in the database and are utilized by the decision model to optimize the completion of future phone calls to that particular phone number.

20 Claims, 2 Drawing Sheets

SYSTEM AND METHOD FOR DELIVERY OF PRE-RECORDED VOICE PHONE MESSAGES

BACKGROUND OF THE INVENTION

The present invention relates to a method and apparatus for delivering pre-recording voice messages to an intended recipient. More specifically, the invention provides for optimally delivering voice messages to an intended recipient by monitoring and analyzing real-time data associated with the phone call and by analyzing historical data related to prior phone calls to the intended recipient.

Currently, it is possible to pre-record voice messages and deliver these voice messages to various intended recipients by placing -phone calls to the intended recipients and playing the recorded message for the intended recipients. In order to deliver the voice message to a large number of intended recipients, such as in a telemarketing context, the delivery of these messages can be automated by utilizing a database to store a set of phone numbers to be called and by utilizing an automated delivery system to access the phone numbers stored in the database, place phone calls to the accessed phone numbers, and play the pre-recorded voice message after the telephone call is established. In this manner, no human intervention is required in order to place the phone calls and deliver the voice message to the intended recipients.

There are drawbacks, however, with the currently known methods for automating the delivery of pre-recorded voice messages. In today's environment, with the wide utilization of telephone answering systems, effective delivery of a pre-recording message is dependent upon, among other factors, whether the phone call is answered by a live recipient or by an answering machine. When a live recipient answers the phone call, delivery of the message should begin as soon as possible in order to minimize the called party's likelihood of hanging up. If a long period of silence is heard by the live recipient before the automated message delivery system begins playing the message, the live recipient is likely to either assume that there is a problem with the phone call (e.g., prank call, wrong number, etc.) or become impatient while waiting for the message to be played. In either situation, the called party is likely to hang up before the recorded message is played which results in an ineffective delivery of the message even though the phone call is completed.

When an answering machine is reached, as opposed to a live recipient, an appropriate delay by the automated message delivery system before playing the recorded message is not only desired but in most situations is required in order to effectively deliver the message. The delivery system must delay the playing of the message so that the message is not played while the recorded greeting by the called party is being played by the answering machine. The delivery system must await both the playing of the recorded greeting and the tone to signify recording has begun before playing the message. Any playing of the recorded message by the message delivery system before these events occur will again result in an ineffective delivery of the recorded message.

An additional issue with respect to effectively delivering messages to answering machines is the issue of ensuring that the message to be delivered is fully recorded by the answering machine, i.e., delivering the complete message from beginning to end during the recording interval of the answering system. If the pre-recorded message is not able to be completely played before the answering machine "times out", again, the message will not be effectively delivered even though the phone call was completed by the automated message delivery system. Therefore, in the answering machine context, as opposed to the situation where a live recipient answers the automated call, prompt initiation of playing the recorded message is not critical, rather the timing of the playing of the message is the critical factor in ensuring effective delivery of the recorded message.

Currently known automated phone message delivery systems are not able to differentiate between the answering of the phone call by a live recipient or by an answering machine. Therefore, the delivery sequence for the recorded message cannot be optimized in order to assist in ensuring effective delivery of the message.

A further drawback with respect to effectively delivering a pre-recorded message to an intended recipient by currently known systems is that the same problems that caused an earlier ineffective delivery of a recorded message to a particular intended recipient are likely to be encountered in subsequent phone calls to that same intended recipient. Currently known systems are not able to "learn" from previous attempts to deliver messages to particular phone numbers, or similar phone numbers, and are thus likely to repeat the same mistakes when delivering future messages to those same phone numbers.

Therefore, it would be desirable to provide for an automated phone message delivery system that could optimize the probability that a pre-recorded message is effectively delivered to an intended recipient, regardless of whether the phone call is answered by a live recipient or by an answering machine. It would also be desirable to provide for an automated message delivery system that could access and analyze historical data from previous phone calls to a particular intended recipient in order to optimize the delivery of future recorded messages to that intended recipient.

SUMMARY OF THE INVENTION

The drawbacks in the prior art are overcome by the present invention for a system and method for automatically delivering pre-recorded messages to intended recipients. In accordance with the present invention, an automated call controller places phone calls to intended recipients and plays a pre-recorded message for the recipient after the call is answered. The automated call controller accesses phone numbers for intended recipients from a database and automatically dials the accessed phone numbers. The automated call controller monitors parameters associated with the telephone call. These parameters can be, for example, the number of rings of the called party's telephone, the time of day of placement of the call, the day of the week of the call, the exchange of the telephone number of the called party, whether the recipient is a household or a business, and the amount of time after the answering of the call before an audible response is heard from the intended recipient's phone. A message delivery decision model analyzes these monitored parameters, and any other parameters input to the decision model, and, based on the analysis of the parameters, optimizes the delivery of the pre-recorded message by the call controller. Results from the completed phone call are stored in the database and are utilized by the decision model to optimize the completion of future phone calls to that particular phone number by the call controller. In addition, externally obtained or validated results associated with phone calls to the intended recipient may be added to the database.

In this manner, the present invention provides for an improved automated message delivery system. The system optimizes the delivery of the recorded message based on monitoring and analyzing parameters associated with the phone call. The present invention increases the probability that the pre-recorded message will be effectively delivered to an intended recipient.

DETAILED DESCRIPTION

Figure 1:
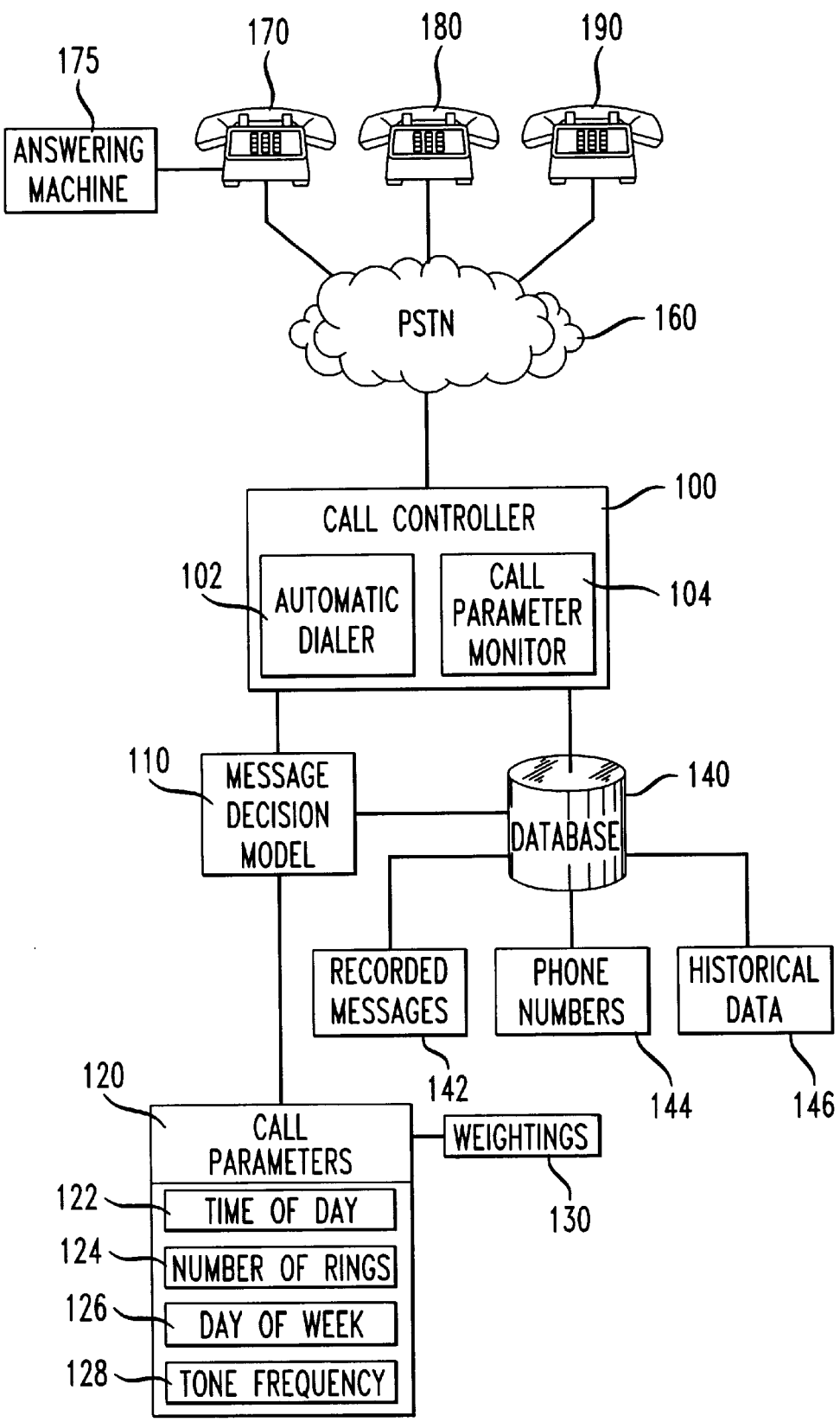
FIG. 1 illustrates an automated message delivery system in accordance with an embodiment the present invention.

FIG. 1 illustrates one embodiment for the automated message delivery system of the present invention. As can be seen, a call controller 100 is connected to a Public Switched Telephone Network (PSTN) 160 for automatically placing phone calls to intended recipients at telephones 170, 180 and 190. Connected to telephone 170 is telephone answering machine 175. The present invention is not limited to only placing phone calls to this quantity of intended recipients. Controller 100 can place phone calls to any number of intended recipients depending upon the requirements of the particular application with which the present invention is utilized.

In practicing the present invention, controller 100 accesses phone numbers for the intended recipients of a pre-recorded message from database 140. The intended recipients' phone numbers are stored in database 140 in data file 144. The pre-recorded message to be delivered to the intended recipient is stored in recorded message data file 142. In order to deliver the pre-recorded message to the intended recipient at, for example, telephone 170, controller 100 will access the phone number for phone 170 from data file 144 and automatic dialer 102 will automatically dial the phone number to establish a phone connection through PSTN 160.

Because the call controller cannot be certain as to whether the intended recipient at phone 170 will personally answer the phone call or whether the phone call will be answered by answering machine 175, and because the optimum timing for the playing of the pre-recorded message can be dependent upon how the phone call is answered (e.g., by a person or by an answering machine), the timing for the playing of the pre-recorded message by controller 100 will be controlled by message delivery decision model 110.

Message delivery decision model 110 utilizes inputs received from controller 100 regarding parameters monitored by call parameter monitor 104 that are associated with the present phone call in order to predict whether the phone call will be answered by a live person or by an answering machine. Message delivery decision model 110 analyzes the monitored parameters and, based on this analysis, predicts how the phone call will be answered. Based on this prediction, decision model 110 will direct call controller 100 to play the pre-recorded message at a specified time after the phone call is answered.

Call controller 100, through call parameter monitor 104, not only monitors parameters associated with the phone call prior to the answering of the phone call but also monitors parameters associated with the phone call during the entire conduct of the phone call. By monitoring parameters during the entire course of the phone call and by providing these parameters to message delivery decision model 110 during the phone call, decision model 110 continues to analyze the parameters during the entire course of the call and is therefore able to assess whether the initial prediction as to how the call would be answered was correct. If the prediction was not correct, decision model 110 may modify the playing of the pre-recorded message by call controller 100 after the call is answered.

Decision model 110 is also able to assess whether the message was effectively delivered by analyzing the phone call parameters during the entire course of the call. If the call was not effectively delivered, call controller 100 can be directed to place a second phone call to the intended recipient and decision model 110 will use the results from monitoring the parameters of the first unsuccessful phone call to modify the playing of the recorded message during the second phone call in order to attempt to ensure that the second phone call successfully delivers the pre-recorded message to the intended recipient. In order to utilize the results of the first phone call to modify the playing of the recorded message in the second phone call, message delivery decision model 110 stores historical information related to the first phone call in historical data file 146 in database 140 and accesses and utilizes this information when determining when the recorded message should be played during the second phone call in attempting to successfully deliver the message to the intended recipient.

When making the determination as to when the message should be played in the second phone call, decision model 110 not only analyzes the results of the unsuccessful phone call to determine when the message should be played, but also call parameter monitor 104 monitors the parameters associated with the second phone call during the conduct of the second call and inputs these parameters to decision model 110. Decision model 110 then analyzes the historical monitored data from the first phone call and the real-time monitored parameters of the second phone call to determine when the message should be played during the second phone call.

Analysis of both the historical monitored data from the first phone call and the real-time parameters of the second phone call in determining when to play the recorded message in the second phone call is desirable because basing the decision for the second phone call solely on the historical results of the first phone call could result in a second unsuccessful attempt if the actions of the called party change after the first attempt (e.g., the answering machine answered the first phone call but the intended recipient answers the second phone call).

It has been discussed that message delivery decision model 110 analyzes the monitored real-time parameters of the immediate phone call and the historical data from any previous phone calls made to the intended recipient to predict how the immediate phone call will be answered, and thus determine when the recorded message should be played in the present phone call. It has also been discussed that decision model 110 continues to analyze the monitored parameters during the entire course of the call to assess whether the message was effectively delivered. If the message was not effectively delivered, call controller 100 can attempt to place a second phone call to the intended recipient to deliver the message and call controller 100 and message delivery system 110 will operate as described above in attempting to successfully deliver the recorded message in the second attempt.

In addition to analyzing monitored real-time parameters of the immediate phone call and the historical monitored data from any previous phone calls made to the intended recipient to predict how the immediate phone call will be answered, message delivery model 110 can analyze externally obtained or validated data associated with the intended recipient in order to predict how the immediate phone call will be answered. This externally obtained or validated data can be entered into the decision model by a user of the system and is thus not obtained from the call parameter monitor. Examples of externally obtained or validated data can be information known by the user that is related to particular intended recipients. This information can be a listing of phone numbers that the user has had difficulty in completing phone calls to, or has never been able to complete phone calls to, and can be a listing of the times of day when previous phone calls to intended recipients have been answered. Additionally, the user may be aware that an intended recipient will personally answer the phone at a particular time of day. All of this externally obtained data, i.e., data not obtained from call parameter monitor 104, can be entered into decision model 110 and analyzed by the model in order to further attempt to optimize the playing of a pre-recorded message for an intended recipient.

A further capability of the present invention, as mentioned previously, is the ability to modify the playing of the pre-recorded message by call controller 100 after the call is answered if the prediction by decision model 110 as to how the call will be answered was wrong. For example, if decision model 110 predicted that the call would be answered by a live person and the call was instead answered by an answering machine, decision model 110 may modify the playing of the recorded message in order to correct the wrong prediction. This modification may consist of changing the timing for the playing of the recorded message or may consist of selecting an alternative message from recorded message data file 142 in database 140 for playing to the intended recipient. It may be desirable to select an alternative message (e.g., a shorter verbal message) for playing if an answering machine answers the phone call rather than a live person in order to attempt to ensure that the entire message is recorded by the answering machine before the allotted recording time for the answering machine is exhausted. The specific modifications that may be made to any particular message delivery decision by decision model 110 are dependent upon the circumstances of the particular message and delivery decision. The present invention is not limited to any particular modification methodology. Because call controller 100 monitors the parameters of the phone call both before and after answering of the phone call, message delivery decision model 110 may be able to correct an incorrect prediction as to how the phone call will be answered before the playing of the recorded message and, thus, modify the message's delivery as appropriate.

As discussed previously, call controller 100 monitors parameters associated with the phone call and message delivery decision model 110 analyzes these monitored parameters. The present invention is not limited to any particular parameters that are to be monitored or to any particular implementation for a decision model. The present invention may be practiced by monitoring any of a wide variety of parameters that may be monitored during a phone call and by utilizing any type of model that is able to analyze input variables and obtain an outcome prediction based on the analysis of these variables.

Several examples of parameters that may be monitored by call parameter monitor 104 of call controller 100 are illustrated in call parameters file 120 as illustrated in FIG. 1. Parameter 122 is the time of day that the phone call is made, parameter 124 is the number of rings before the phone call is answered, parameter 126 is the day of the week of the call, and parameter 128 is the frequency of the tone of an answering device if an answering device answers the phone. With respect to parameter 128, which is the tone frequency, different types of answering devices may utilize different tone frequencies and, by monitoring the tone, the type of answering device that is answering the call may be determined. Thus, information about the characteristics of the particular answering device may be determined, e.g., time required before recording begins after answering of the call, by monitoring the tone and the delivery of the recorded message can be optimized as appropriate.

Other parameters that could be monitored are whether the called telephone number is a residential or a business phone number and the duration of the speech energy in the answering greeting before the first brief silent "pause". An additional parameter that could be monitored is a response to an inquiry by the call controller, such as a "polling" of "live" recipients to respond by touch tone to verify that they are in fact a live recipient. All of these parameters, and others, could be used as predictors for whether a live person or an answering machine will/has answered the call. As stated previously, call controller 100 monitors parameters associated with the call both before the call is answered and after the call is answered. A parameter that is particularly useful to monitor after the call is answered, as mentioned above, is whether an answering machine's recording "tone" is heard during the phone call. This information is particularly useful for not only attempting to modify the delivery of a message but also to assess whether the attempted message delivery was successful. For example, if decision model 110 has predicted that the phone call will be answered by a live person and the recorded message has been played based on this prediction and during the playing of the message a tone is heard, it is probably likely that the prediction was wrong and that the message delivery was not successful.

The relationships among the various parameters that may be monitored could be complex. For example, a phone call to a residential phone number during daytime hours, if answered within 1–2 rings or after 5 or more rings, has probably been answered by a live person. However, a phone call to a business establishment during regular work hours, if answered after 5 or more rings, is almost certainly being answered by a voice mail system. Similarly, a residential "live" recipient's greeting (e.g., a "hello") likely takes about 1–2 seconds to complete, but a live greeting at a business phone likely takes about 3–5 seconds to complete. Therefore, data associated with these parameters are analyzed in decision model 110.

FIG. 1 illustrates that weightings 130 can be assigned to each parameter based on the relative importance of each particular parameter and the relationships between particular parameters. For example, the most reliable parameters (predictors) could be assigned a greater weight than lesser reliable parameters. A particular type of decision model that could be utilized in the present invention is a Bayesian decision model. As stated previously, the present invention is not limited to any particular type of decision model nor to any particular set of predictive parameters or weightings associated with the parameters.

Figure 2:
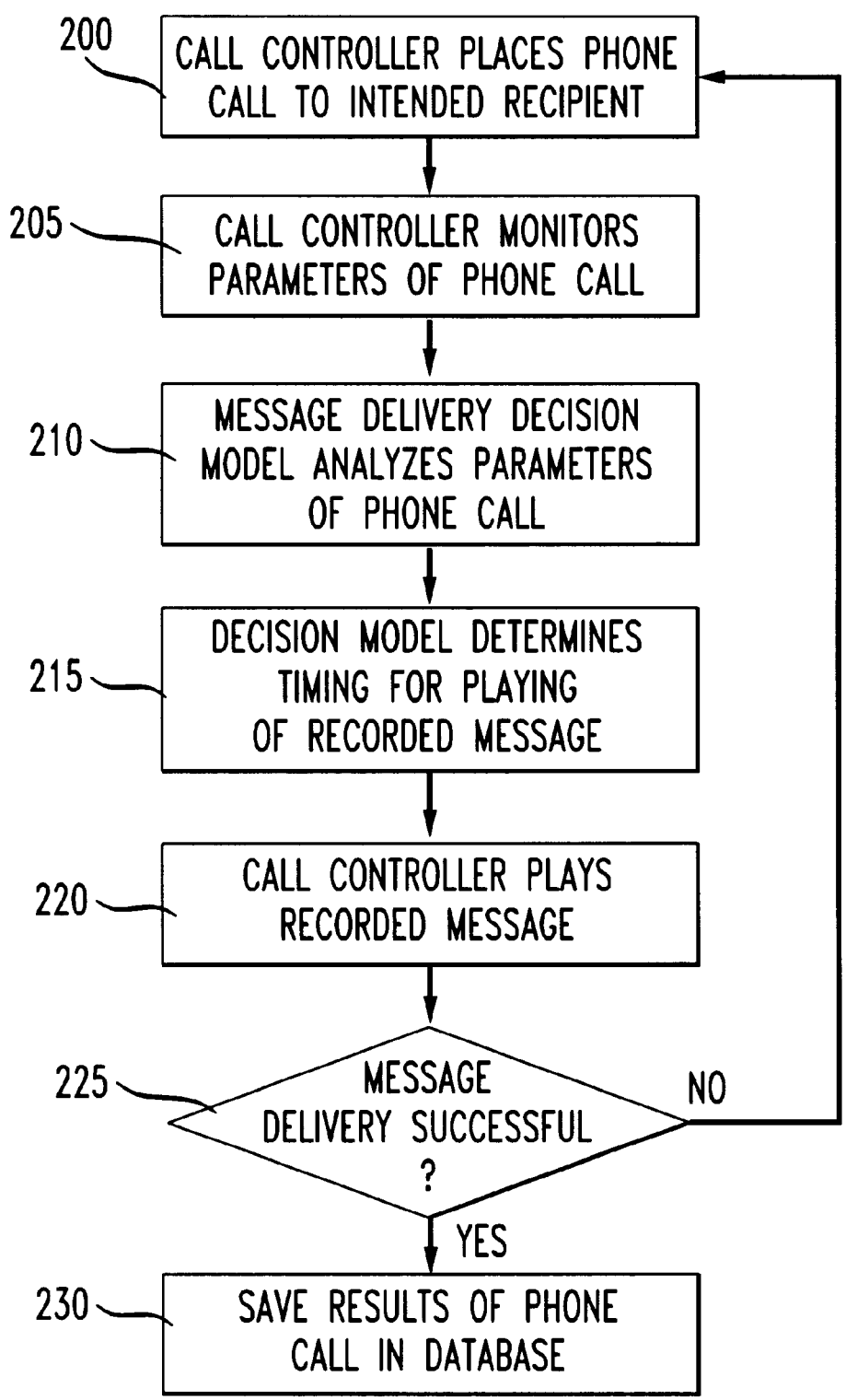
FIG. 2 illustrates a process flow chart for practicing one embodiment of the automated message delivery system of the present invention.

The basic method steps for practicing the present invention are illustrated in FIG. 2. As shown, in step 200, call controller 100 places a phone call to the intended recipient. In step 205, the call controller monitors parameters associated with the phone call. The call controller inputs these monitored parameters into message delivery decision model 110 where the decision model analyzes the parameters, step 210. Based on the analysis of the monitored parameters, message delivery decision model 110 predicts whether the call will be answered by a live person or an answering device and determines a message start time for playing the pre-recorded message by the call controller, step 215. In step 220, call controller 100 plays the recorded message.

Decision model 110, based on the monitoring of the phone call by the call controller, will assess the probability that the message was effectively received by the intended recipient, step 225. If the probability is high that the message was effectively delivered, the results of the message delivery will be stored in database 140 for reference when placing future phone calls to that particular intended recipient, step 230. If the probability is high that the message was not effectively delivered, the call controller can repeat the attempt to deliver the message.

The method steps shown in FIG. 2 are not intended to be all inclusive of all of the features of the present invention, as described in this specification. The specification, when read as a whole, fully describes the message delivery system of the present invention.

The disclosed embodiments are illustrative of the various ways in which the present invention may be practiced. Other embodiments can be implemented by those skilled in the art without departing from the spirit and scope of the present invention.

What is claimed is:

1. A method for automatically delivering a pre-recorded message to an intended recipient, comprising the steps of:
   automatically dialing a phone number for the intended recipient to establish a telephone call with the intended recipient;
   monitoring parameters associated with the telephone call wherein said parameters include historical monitored data obtained during a prior telephone call placed to the intended recipient;
   analyzing said parameters; and
   controlling a start time of a playing of a pre-recorded message after the telephone call is answered based upon said analysis of said parameters.

2. The method of claim 1 wherein said parameters include real-time data associated with the telephone call.

3. The method of claim 2 wherein one of said parameters associated with the telephone call including real-time monitored data is the number of telephone rings before the telephone call is answered.

4. The method of claim 1 further comprising the step of storing information in a database related to the telephone call.

5. The method of claim 4 further comprising the steps of:
   accessing said information stored in said database related to the telephone call;
   establishing a second subsequent phone call to the intended recipient; and
   controlling playing of the pre-recorded message for the intended recipient based on said accessed information.

6. The method of claim 1 wherein the step of analyzing said parameters comprises the step of assigning relative weights of importance to each of said monitored parameters.

7. The method of claim 1 wherein the step of analyzing said parameters comprises the steps of:
   inputting values associated with each of said monitored parameters into an analytical decision model; and
   assigning relative weights of importance to each of said parameters.

8. The method of claim 1 wherein one of said parameters including historical monitored data obtained during a prior telephone call placed to the intended recipient is the number of telephone rings before answering of the prior telephone call to the intended recipient.

9. The method of claim 1 wherein the step of controlling a start time of a playing of a pre-recorded message includes the step of selecting an alternative message from a database based upon said analysis of said parameters.

10. A method for determining the success of automatically delivering a pre-recorded telephone message to an intended recipient, comprising the steps of:
    defining parameters associated with a telephone call to be monitored during the telephone call;
    assigning relative weights of importance to each of said defined parameters associated with the telephone call to be monitored during the telephone call;
    monitoring each of said parameters associated with the telephone call during the phone call;
    determining a value for each parameter during the telephone call, said value quantifying said parameter during the telephone call;
    associating the assigned relative weights of importance for each parameter with the value determined for each parameter during the telephone call; and
    determining a probability of successful delivery of said pre-recorded message to the intended recipient.

11. The method of claim 10 further comprising the step of storing said probability of successful delivery of said pre-recorded message to the intended recipient in a database.

12. The method of claim 11 further comprising the step of determining a method of delivery of a second subsequent pre-recorded message to the intended recipient by utilizing said probability of successful delivery of said pre-recorded message.

13. A system for automatically delivering a pre-recorded voice message to an intended recipient, comprising:
    a call controller that delivers a pre-recorded message to an intended recipient, said call controller including an automatic dialer that dials a phone number for the intended recipient to establish a phone call with the intended recipient and a call parameter monitor, said call parameter monitor monitoring real-time parameters associated with the phone call; and
    a message delivery decision model wherein said decision model receives data representing said real-time parameters from said call parameter monitor and wherein said decision model accesses historical monitored data obtained during a previous phone call to the intended recipient and further wherein said decision model determines a message start time for playing said pre-recorded message after the phone call is answered by analyzing said data representing said real-time parameters and said historical monitored data;
    said call controller receiving an output from said decision model and audibly playing the pre-recorded message for the intended recipient based on said message start time.

14. The system for automatically delivering a pre-recorded voice message to an intended recipient of claim 13 further comprising a database wherein said pre-recorded message is stored in said database and wherein said call controller accesses said database to retrieve said pre-recorded message for delivery to the intended recipient.

15. The system for automatically delivering a pre-recorded voice message to an intended recipient of claim 14 wherein said database stores data related to said monitored parameters for the phone call to the intended recipient.

16. The system for automatically delivering a pre-recorded voice message to an intended recipient of claim 14 wherein said database contains an alternatively formatted pre-recorded message that is associated with said pre-recorded message.

17. The system for automatically delivering a pre-recorded voice message to an intended recipient of claim 13 wherein said message delivery decision model includes relative weights of importance associated with each of said monitored parameters.

18. A method for automatically delivering a pre-recorded message to an intended recipient, comprising the steps of:

accessing historical monitored parameters obtained during a prior telephone call to an intended recipient stored in a database, said historical monitored parameters obtained by a call parameter monitor;

analyzing said historical monitored parameters;

establishing a present telephone call with the intended recipient; and controlling a start time for a playing of a pre-recorded message for the intended recipient based upon said analysis of said historical monitored parameters.

19. The method of claim 18 wherein one of said historical monitored parameters is the time of day of completed prior telephone calls with the intended recipient.

20. The method of claim 18 further comprising the step of analyzing externally obtained data associated with the intended recipient.

* * * * *